United States Patent
Lin et al.

(10) Patent No.: US 10,661,912 B2
(45) Date of Patent: May 26, 2020

(54) ADDRESSING METHOD FOR FUNCTIONAL MODULES OF A MOVABLE OBJECT

(71) Applicant: SZ DJI TECHNOLOGY Co., LTD., Shenzhen (CN)

(72) Inventors: Kaihong Lin, Shenzhen (CN); Wenlong Xiao, Shenzhen (CN); Xiaojian Wan, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 116 days.

(21) Appl. No.: 15/495,614

(22) Filed: Apr. 24, 2017

(65) Prior Publication Data

US 2017/0225795 A1 Aug. 10, 2017

Related U.S. Application Data

(63) Continuation of application No. PCT/CN2014/091798, filed on Nov. 20, 2014.

(51) Int. Cl.
*B64D 31/06* (2006.01)
*G06F 12/02* (2006.01)
*B64C 39/02* (2006.01)

(52) U.S. Cl.
CPC ............ *B64D 31/06* (2013.01); *B64C 39/024* (2013.01); *G06F 12/02* (2013.01);
(Continued)

(58) Field of Classification Search
CPC ....... H04W 8/26; B64D 31/06; B64C 39/024; B64C 2201/024; B64C 2201/027; B64C 2201/146; B64C 2201/108
See application file for complete search history.

(56) References Cited

U.S. PATENT DOCUMENTS 6,467,065 B1 10/2002 Mendez et al.
6,629,172 B1 9/2003 Andersson et al.
(Continued)

FOREIGN PATENT DOCUMENTS

CN 101123613 A 2/2008
CN 102213959 A 10/2011
(Continued)

OTHER PUBLICATIONS

Wigmore, Ivy, "volatile memory", Dec. 5, 2012, WhatIs.com, <https://whatis.techtarget.com/definition/volatile-memory> (Year: 2012).*
(Continued)

*Primary Examiner* — Genna M Mott
(74) *Attorney, Agent, or Firm* — Anova Law Group, PLLC

(57) ABSTRACT

Systems, methods, and devices for assigning addresses to a plurality of functional modules carried by a movable object are provided. In one aspect, a method can comprise: (a) transmitting an activation signal from a control module to a functional module of the plurality of functional modules via a first communication interface, thereby activating the functional module for addressing, wherein the plurality of functional modules are each configured to control a component of the movable object; (b) transmitting an addressing signal comprising an address from the control module to each functional module of the plurality of functional modules via a second communication interface different from the first communication interface, thereby causing the address to be assigned to the activated functional module of step (a); and (c) repeating steps (a) and (b) for each functional module, thereby assigning an address to each functional module.

20 Claims, 11 Drawing Sheets

(52) U.S. Cl.
CPC .. *B64C 2201/024* (2013.01); *B64C 2201/027* (2013.01); *B64C 2201/108* (2013.01); *B64C 2201/146* (2013.01)

(56) References Cited

U.S. PATENT DOCUMENTS

| | | | |
|---|---|---|---|
| 8,225,021 | B2 | 7/2012 | Adkins et al. |
| 2002/0046309 | A1* | 4/2002 | Boesinger ............. H04L 12/403 710/100 |
| 2008/0307131 | A1 | 12/2008 | Simon |
| 2009/0272854 | A1 | 11/2009 | Violett |
| 2011/0289237 | A1* | 11/2011 | Zhang .................... G06F 13/37 710/9 |
| 2012/0221755 | A1 | 8/2012 | Schultz |
| 2012/0330481 | A1 | 12/2012 | Feldkamp et al. |
| 2013/0068892 | A1 | 3/2013 | Bin et al. |
| 2013/0162426 | A1 | 6/2013 | Wiesner et al. |
| 2014/0131510 | A1* | 5/2014 | Wang .................... B64C 39/024 244/17.23 |
| 2016/0371210 | A1* | 12/2016 | Van Der Zande ......................... G06F 13/4291 |

FOREIGN PATENT DOCUMENTS

| | | |
|---|---|---|
| CN | 102830708 A | 12/2012 |
| CN | 103365215 A | 10/2013 |
| CN | 103621049 A | 3/2014 |
| EP | 1284556 A1 | 2/2003 |
| EP | 2388960 A1 | 11/2011 |
| JP | 2011251678 A | 12/2011 |
| WO | WO-0042740 A1 | 7/2000 |
| WO | WO-2014075609 A1 | 5/2014 |
| WO | WO-2014108026 A1 | 7/2014 |

OTHER PUBLICATIONS

European search report and search opinion dated Dec. 2, 2016 for EP Application No. 14906298.6.

International search report and written opinion dated Aug. 17, 2015 for PCT/CN2014/091798.

* cited by examiner

ADDRESSING METHOD FOR FUNCTIONAL MODULES OF A MOVABLE OBJECT

CROSS-REFERENCE

This application is a continuation of International Application No. PCT/CN2014/091798, filed Nov. 20, 2014, the entire content of which is hereby incorporated by reference.

BACKGROUND

Unmanned vehicles such as unmanned aerial vehicles (UAVs) can be used to perform surveillance, reconnaissance, and exploration tasks for a wide variety of military and civilian applications. In some instances, a UAV can include a plurality of functional modules that control the operation of UAV components such as propulsion units. The functional modules can be controlled by a central control module.

Existing approaches for communication between a central control module and multiple functional modules may not be optimal in some instances. For example, some communication schemes may be limited to unidirectional signal transmission from the control module to the functional modules, which may prevent the control module from obtaining feedback information directly from the functional modules.

SUMMARY

The present disclosure provides systems, methods, and devices for improved communication between a central control module and one or more functional modules carried by a movable object such as an electronic speed control (ESC) module. Each of the functional modules can be operably coupled to the control module through a shared communication interface used for two-way communication (e.g., a bus interface) as well as a private communication interface used only for one-way communication (e.g., a pulse-position modulation (PPM) signal line). Each functional module can be assigned a unique identifier or address in order to enable the control module to communicate with specific modules over the shared communication interface. In some embodiments, the control module assigns an address to each functional module by activating a selected functional module through the private communication interface, then transmitting an addressing command through the shared communication interface. Various embodiments provided herein enable dynamic addressing of the functional modules, thereby enhancing versatility and convenience when using multiple functional modules. Moreover, the systems, methods, and devices presented herein allow for bidirectional communication between the control module and the functional modules, thereby improving the operation of movable objects such as unmanned aerial vehicles.

Thus, in one aspect, a method for assigning addresses to a plurality of functional modules carried by a movable object is provided. The method comprises: (a) transmitting an activation signal from a control module to a functional module of the plurality of functional modules via a first communication interface, thereby activating the functional module for addressing, wherein the plurality of functional modules are each configured to control a component of the movable object; (b) transmitting an addressing signal comprising an address from the control module to each functional module of the plurality of functional modules via a second communication interface different from the first communication interface, thereby causing the address to be assigned to the activated functional module of step (a); and (c) repeating steps (a) and (b) for each functional module, thereby assigning an address to each functional module.

In some embodiments, the movable object is an unmanned aerial vehicle.

In some embodiments, the plurality of functional modules comprises a plurality of electronic speed control (ESC) modules each operably coupled to a corresponding propulsion unit of the movable object. The movable object can comprise four ESC modules and four corresponding propulsion units. The corresponding propulsion unit can comprise a rotor and a motor configured to drive rotation of the rotor. Each ESC module can be configured to generate control signals for controlling the corresponding propulsion unit. The control signals can comprise at least one of: a pulse position modulation signal, a chopper signal, an input port signal, or an output port signal.

In some embodiments, the plurality of functional modules comprises a plurality of sensor control modules each operably coupled to a corresponding sensor of the movable object.

In some embodiments, the first communication interface operably couples the control module to only the functional module. The first communication interface can be a unidirectional communication interface allowing one-way communication from the control module to the functional module. The one-way communication can comprise at least one of: pulse position modulation signals, pulse width modulation signals, or analog voltage signals.

In some embodiments, the second communication interface is a bidirectional communication interface allowing two-way communication between the control module and each functional module. The second communication interface can be a bus interface, such as a bus interface comprising at least one of: a 485 bus, an I2C bus, a SPI bus, or a CAN bus.

In some embodiments, the address is assigned to the activated functional module by at least storing the address in a memory associated with the selected functional module. The memory can be a random-access memory (RAM).

In some embodiments, the steps (a)-(c) are performed each time the movable object is powered on.

In some embodiments, the method further comprises: (d) transmitting a query signal to each functional module via the second communication interface, the query signal comprising an address assigned to a functional module of the plurality of functional modules; and (e) receiving a response signal from the functional module having the address. The query signal can comprise a request for state information of the functional module having the address, and the response signal can comprise the state information of said functional module. The functional module can be an electronic speed control (ESC) module coupled to an actuator and the state information can comprise a rotation speed of the actuator or a current value for the ESC module. The steps (d) and (e) can be repeated at predetermined time intervals during operation of the movable object.

In some embodiments, the method further comprises: (f) determining, using the control module, a control scheme for the movable object based on the state information. The method can further comprise: (f) storing the state information in a memory operably coupled to the control module.

In another aspect, a control module for controlling a plurality of functional module carried by a movable object is provided. The control module comprises: one or more processors; and memory comprising instructions executable by the one or more processors to cause the control module to at least: (a) transmit an activation signal to a functional module of the plurality of functional modules via a first communication interface, thereby activating the functional module for addressing, wherein the plurality of functional modules are each configured to control a component of the movable object; (b) transmit an addressing signal comprising an address to each functional module of the plurality of functional modules via a second communication interface different from the first communication interface, thereby causing the address to be assigned to the activated functional module of step (a); and (c) repeat steps (a) and (b) for each functional module, thereby assigning an address to each functional module.

In some embodiments, the movable object is an unmanned aerial vehicle.

In some embodiments, the plurality of functional modules comprises a plurality of electronic speed control (ESC) modules each operably coupled to a corresponding propulsion unit of the movable object. The movable object can comprise four ESC modules and four corresponding propulsion units. The corresponding propulsion unit can comprise a rotor and a motor configured to drive rotation of the rotor. Each ESC module can be configured to generate control signals for controlling the corresponding propulsion unit. The control signals can comprise at least one of: a pulse position modulation signal, a chopper signal, an input port signal, or an output port signal.

In some embodiments, the plurality of functional modules comprises a plurality of sensor control modules each operably coupled to a corresponding sensor of the movable object.

In some embodiments, the first communication interface operably couples the control module to only the corresponding functional module. The first communication interface can be a unidirectional communication interface allowing one-way communication from the control module to the corresponding functional module. The one-way communication can comprise at least one of: pulse position modulation signals, pulse width modulation signals, or analog voltage signals.

In some embodiments, the second communication interface is a bidirectional communication interface allowing two-way communication between the control module and each functional module. The second communication interface can be a bus interface, such as a bus interface comprising at least one of: a 485 bus, an I2C bus, a SPI bus, or a CAN bus.

In some embodiments, the address is assigned to the activated functional module by at least storing the address in a memory associated with the selected functional module. The memory can be a random-access memory (RAM).

In some embodiments, the steps (a)-(c) are performed each time the movable object is powered on.

In some embodiments, the instructions further cause the control module to: (d) transmit a query signal to each functional module via the second communication interface, the query signal comprising an address assigned to a functional module of the plurality of functional modules; and (e) receive a response signal from the functional module having the address. The query signal can comprise a request for state information of the functional module having the address, and the response signal can comprise the state information of said functional module. The functional module can be an electronic speed control (ESC) module coupled to an actuator and the state information can comprise a rotation speed of the actuator or a current value for the ESC module. The steps (d) and (e) can be repeated at predetermined time intervals during operation of the movable object.

In some embodiments, the instructions further cause the control module to: (f) determine a control scheme for the movable object based on the state information. The method can further comprise: (f) store the state information in a memory operably coupled to the control module.

In another aspect, a movable object comprising the control module is provided.

In another aspect, a system for assigning addresses to a plurality of functional modules carried by a movable object is provided. The system comprises: a plurality of functional modules each configured to control a component of the movable object; a control module configured to transmit signals to the plurality of functional modules; a plurality of first communication interfaces each operably coupling the control module to a corresponding functional module of the plurality of functional modules; and a second communication interface operably coupling the control module to each functional module of the plurality of functional modules, wherein the control module is configured to: (a) transmit an activation signal to a functional module of the plurality of functional modules via a corresponding first communication interface of the plurality of first communication interfaces, thereby activating the functional module for addressing; (b) transmit an addressing signal comprising an address to each functional module of the plurality of functional modules via the second communication interface, thereby causing the address to be assigned to the activated functional module of step (a); and (c) repeat steps (a) and (b) for each functional module, thereby assigning an address to each functional module.

In another aspect, a method for assigning addresses to a plurality of functional modules carried by a movable object is provided. The method comprises: (a) receiving, at each functional module of the plurality of functional modules, an addressing signal comprising an address and transmitted from a control module via a shared communication interface, wherein the plurality of functional modules are each configured to control a component of the movable object; (b) assessing, for each functional module, whether the functional module has previously received an activation signal transmitted from the control module via a respective private communication interface; and (c) assigning the address to the functional module if the functional module previously received the activation signal according to the assessment of step (b).

In some embodiments, the movable object is an unmanned aerial vehicle.

In some embodiments, the plurality of functional modules comprises a plurality of electronic speed control (ESC) modules each operably coupled to a corresponding propulsion unit of the movable object. The movable object can comprise four ESC modules and four corresponding propulsion units. The corresponding propulsion unit can comprise a rotor and a motor configured to drive rotation of the rotor. Each ESC module can be configured to generate control signals for controlling the corresponding propulsion unit. The control signals can comprise at least one of: a pulse position modulation signal, a chopper signal, an input port signal, or an output port signal.

In some embodiments, the plurality of functional modules comprises a plurality of sensor control modules each operably coupled to a corresponding sensor of the movable object.

In some embodiments, the private communication interface operably couples the control module to only the functional module. The private communication interface can be a unidirectional communication interface allowing one-way communication from the control module to the functional module. The one-way communication can comprise at least one of: pulse position modulation signals, pulse width modulation signals, or analog voltage signals.

In some embodiments, the shared communication interface is a bidirectional communication interface allowing two-way communication between the control module and each functional module. The shared communication interface can be a bus interface, such as a bus interface comprising at least one of: a 485 bus, an I2C bus, a SPI bus, or a CAN bus.

In some embodiments, the address is assigned to the activated functional module by at least storing the address in a memory associated with the selected functional module. The memory can be a random-access memory (RAM).

In some embodiments, the method further comprises: (d) transmitting a confirmation signal from the functional module of step (c) to the control module via the shared communication interface if the address was assigned to the functional module in step (c).

In some embodiments, the method further comprises: (d) receiving, at each functional module, a query signal from the control module via the shared communication interface, the query signal comprising an address; (e) assessing, for each functional module, whether the functional module has been assigned the address of step (d); and (f) transmitting a response signal to the control module via the shared communication interface if the functional module has been assigned the address according to the assessment of step (e). The query signal can comprise a request for state information of the functional module having the address, and the response signal can comprise the state information generated by said functional module. The functional module can be an electronic speed control (ESC) module coupled to an actuator and the state information can comprise a rotation speed of the actuator or a current value for the ESC module. The steps (d)-(f) can be repeated at predetermined time intervals during operation of the movable object.

In another aspect, a functional module for controlling a component of a movable object is provided. The functional module comprises: one or more processors; and memory comprising instructions executable by the one or more processors to cause the functional module to at least: (a) receive an addressing signal comprising an address and transmitted from a control module via a shared communication interface; (b) assess whether the functional module has previously received an activation signal transmitted from the control module via a private communication interface; and (c) assign the address to the functional module if the functional module previously received the activation signal according to the assessment of step (b).

In some embodiments, the movable object is an unmanned aerial vehicle.

In some embodiments, the plurality of functional modules comprises a plurality of electronic speed control (ESC) modules each operably coupled to a corresponding propulsion unit of the movable object. The movable object can comprise four ESC modules and four corresponding propulsion units. The corresponding propulsion unit can comprise a rotor and a motor configured to drive rotation of the rotor. Each ESC module can be configured to generate control signals for controlling the corresponding propulsion unit. The control signals can comprise at least one of: a pulse position modulation signal, a chopper signal, an input port signal, or an output port signal.

In some embodiments, the plurality of functional modules comprises a plurality of sensor control modules each operably coupled to a corresponding sensor of the movable object.

In some embodiments, the private communication interface operably couples the control module to only the functional module. The private communication interface can be a unidirectional communication interface allowing one-way communication from the control module to the functional module. The one-way communication can comprise at least one of: pulse position modulation signals, pulse width modulation signals, or analog voltage signals.

In some embodiments, the shared communication interface is a bidirectional communication interface allowing two-way communication between the control module, the functional module, and one or more additional functional modules. The shared communication interface can be a bus interface, such as a bus interface comprising at least one of: a 485 bus, an I2C bus, a SPI bus, or a CAN bus.

In some embodiments, the address is assigned to the activated functional module by at least storing the address in a memory associated with the selected functional module. The memory can be a random-access memory (RAM).

In some embodiments, the instructions further cause the functional module to: (d) transmit a confirmation signal from the functional module of step (c) to the control module via the shared communication interface if the address was assigned to the functional module in step (c).

In some embodiments, the instructions further cause the functional module to: (d) receive a query signal from the control module via the shared communication interface, the query signal comprising an address; (e) assess whether the functional module has been assigned the address of step (d); and (f) transmit a response signal to the control module via the shared communication interface if the functional module has been assigned the address according to the assessment of step (e). The query signal can comprise a request for state information of the functional module having the address, and the response signal can comprise the state information generated by the functional module. The functional module can be an electronic speed control (ESC) module coupled to an actuator and the state information can comprise a rotation speed of the actuator or a current value for the ESC module. The steps (d)-(f) can be repeated at predetermined time intervals during operation of the movable object.

In another aspect, a movable object comprising the functional module is provided.

In another aspect, a system for assigning addresses to a plurality of functional modules of a movable object is provided. The system comprises: a plurality of functional modules each configured to control a component of the movable object; a control module configured to transmit signals to the plurality of functional modules; a shared communication interface operably coupling the control module to each functional module of the plurality of functional modules; and a plurality of private communication interfaces each operably coupling the control module to a corresponding functional module of the plurality of functional modules, wherein each functional module of the plurality of functional modules is configured to: (a) receive an addressing signal comprising an address and transmitted from the control module via the shared communication interface; (b) assess whether the functional module has previously received an activation signal transmitted from the control module via a respective private communication interface of the plurality of private communication interfaces; and (c) assign the address to the functional module if the functional module previously received the activation signal according to the assessment of step (b).

In another aspect, a plurality of electronic speed control (ESC) modules for controlling a plurality of propulsion units of a multi-rotor unmanned aerial vehicle (UAV) is provided. Each of the ESC modules comprises: a first communication interface adapted to receive control signals from a control module for controlling actuation of a corresponding propulsion unit of the plurality of propulsion units, the first communication interface being a one-way communication interface; a second communication interface adapted to receive command signals from a control module and transmit response signals to the control module, the second communication interface being a two-way communication interface; a third communication interface adapted to transmit actuation signals to the corresponding propulsion unit; one or more processors; and memory comprising instructions executable by the one or more processors to cause said ESC module to at least: generate the actuation signals based on the control signals for controlling actuation of the corresponding propulsion unit; and generate the response signals based on the command signals from the control module.

In some embodiments, the UAV comprises four ESC modules and four propulsion units. Each propulsion unit of the plurality of propulsion units can comprise a rotor and a motor configured to drive rotation of the rotor. The actuation signals can comprise at least one of: a pulse position modulation signal, a chopper signal, an input port signal, or an output port signal.

In some embodiments, the first communication interface operably couples said ESC module to only the control module. The control signals can comprise at least one of: pulse position modulation signals, pulse width modulation signals, or analog voltage signals.

In some embodiments, the second communication interface is a bus interface, such as a bus interface comprising at least one of: a 485 bus, an I2C bus, a SPI bus, or a CAN bus.

In some embodiments, the state information comprises information relating to an operational status of the ESC module. The state information can comprise fault information for the ESC module.

In some embodiments, each ESC module further comprises a memory adapted to store an address associated with said ESC module. The address can be a dynamic address or a static address.

It shall be understood that different aspects of the invention can be appreciated individually, collectively, or in combination with each other. Various aspects of the invention described herein may be applied to any of the particular applications set forth below or for any other types of movable objects. Any description herein of an aerial vehicle may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space. Furthermore, any description herein of a rotor or rotor assembly may apply to and be used for any propulsion system, device, or mechanism configured to generate a propulsive force by rotation (e.g., propellers, wheels, axles).

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
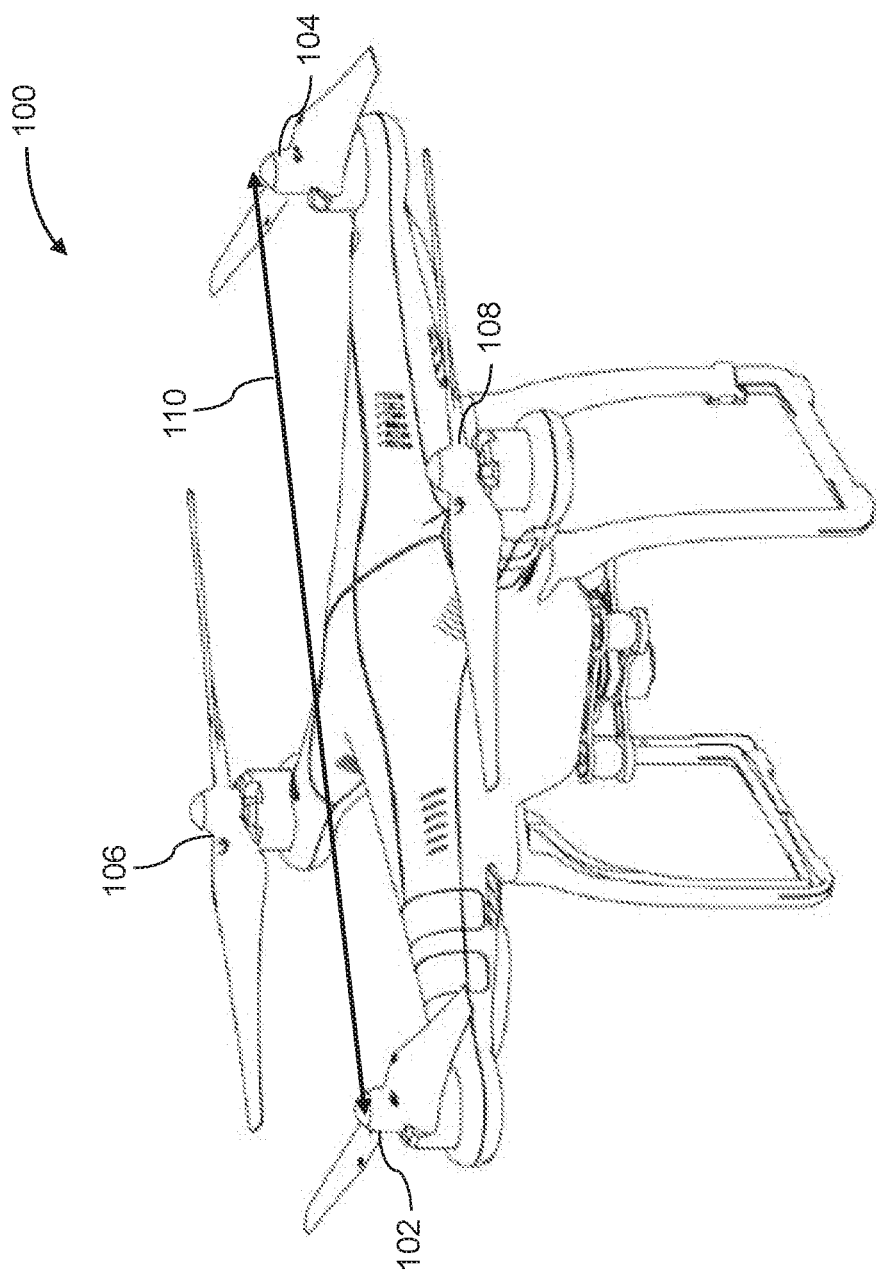
FIG. 1 illustrates an unmanned aerial vehicle (UAV), in accordance with embodiments.

The present disclosure provides improved systems, methods, and devices for controlling and communicating with functional modules in a movable object such as an unmanned aerial vehicle (UAV). In some embodiments, the functional modules control the operation of various components of the movable object (e.g., propulsion units, sensors) based on commands received from a central control module. The control module can be operably coupled to each of the functional modules through a shared communication interface that permits two-way communication, thereby allowing the control module to receive feedback and other types of relevant information from the functional modules. In order to enable the control module to direct commands to specific functional modules via the shared communication interface, each functional module can be assigned a unique address. In some embodiments, the address assignment is performed dynamically by sequentially activating each functional module via a private communication interface, then transmitting the address information via the shared communication interface. Advantageously, the approaches described herein can be used to dynamically address a plurality of functional modules in a rapid and versatile manner, as well as provide improved communication between functional modules and a control module.

For example, a multi-rotor UAV can include a plurality of electronic speed control (ESC) modules each operably coupled to a rotor in order to control the rotation of the rotor. Each ESC module can be coupled to a flight control module via a private pulse-position modulation (PPM) signal line that permits control signals to be transmitted from the flight control module to the ESC module. Additionally, the ESC modules can be configured to transmit information to the control module, e.g., information regarding the current operational status of the ESC module and/or the coupled rotor. Accordingly, the flight control module can be coupled to the ESC modules via a shared bus interface that enables feedback to be transmitted from the ESC modules to the flight control module. This bidirectional communication scheme can facilitate monitoring of the operation of the ESC module and/or rotor, e.g., for fault detection purposes, and can improve the stability and control of the movable object.

Moreover, in order to facilitate communication between the flight control module and the ESC modules over the shared bus interfaces, each ESC module can be assigned a unique address. The addressing procedure can be performed dynamically by sequentially activating each ESC module via the private PPM signal line, then transmitting address information over the bus interface in order to assign the address to only the activated the ESC module. Dynamic addressing can provide rapid and versatile address assignment of the ESC modules without requiring individualized firmware and/or hardware for each module. This can be beneficial in terms of improving user convenience when changing or replacing ESC modules.

The systems, methods, and devices of the present disclosure can be applied to any type of movable object, such as UAVs. It shall be appreciated that any description herein of a UAV may apply to and be used for any movable object, and vice-versa. Additional examples of movable objects suitable for use with the present disclosure are provided below. The movable objects described herein can be operated completely autonomously (e.g., by a suitable computing system such as an onboard control module), semi-autonomously, or manually (e.g., by a human user). The movable object can receive commands from a suitable entity (e.g., human user or autonomous control module) and respond to such commands by performing one or more actions. For example, the movable object can be controlled to take off from the ground, move within the air (e.g., with up to three degrees of freedom in translation and up to three degrees of freedom in rotation), move to target location or to a sequence of target locations, hover within the air, land on the ground, and so on. As another example, the movable object can be controlled to move at a specified velocity and/or acceleration (e.g., with up to three degrees of freedom in translation and up to three degrees of freedom in rotation) or along a specified movement path. Furthermore, the commands can be used to control one or more movable object components, such as the components described herein (e.g., sensors, actuators, propulsion units, payload, etc.). For instance, some commands can be used to control the position, orientation, and/or operation of a movable object payload such as a camera.

In some embodiments, the movable object includes a plurality of components that are controllable to perform various operations. Examples of components that can be included in a movable object include but are not limited to: propulsion units that effect movement of the movable object (e.g., with respect to up to three degrees of freedom in translation and up to three degrees of freedom in rotation), sensors that collect various types of information (e.g., state information, environmental information), communication modules that facilitate communication between the movable object and one or more remote devices (e.g., a remote controller or terminal), or suitable combinations thereof. The components can respond to control signals in order to perform the operations. Optionally, the components can generate feedback signals that providing information regarding the operational status of the components. In some embodiments, if a fault or error occurs during operation of the components, the components can generate fault or error signals that facilitate diagnosis of the fault or error.

For example, the movable object can include one or more propulsion units (also referred to herein as "propulsion mechanisms") that are actuated in order to effect movement of the movable object. Exemplary propulsion units can include one or more engines, motors, wheels, axles, magnets, rotors, propellers, blades, nozzles, or suitable combinations thereof. The movable object can include any suitable number of propulsion units, such as one, two, three, four, five, six, seven, eight, or more propulsion units. The propulsion units may all be of the same type. Alternatively, the movable object can use include types of propulsion units. The propulsion units can be mounted on the movable object in a variety of ways, e.g., via a fixed coupling, a releasable coupling, a movable coupling, a rotatable coupling, and the like. The propulsion units can be mounted on any suitable portion of the movable object, such on the top, bottom, front, back, sides, or suitable combinations thereof. Different propulsion units can be situated on different portions of the movable object. The positions of the propulsion units on the movable object can be fixed. Alternatively, some or all of the propulsion units can be movable relative to the movable object. For example, a movable object (e.g., a UAV) can have a central body and a plurality of branch members or arms extending outward from the central body. The branch members can be fixed relative to the central body and/or to each other. Alternatively, some or all of the branch members can be movable relative to the central body and/or to each other, e.g., by translating, rotating, folding, telescoping, bending, and the like. In some embodiments, the branch members can be rotated to a plurality of different angles relative to a vertical axis of the movable object. The propulsion units of the movable object can be positioned on the branch members, e.g., near the distal portions of the branch members, such that the propulsion units are moved relative to each other and/or the central body according to the movement of the branch members.

The propulsion units can include one or more components that are actuated (e.g., by a suitable actuator such as a motor or engine) in order to provide forces that effect movement of the movable object. In some embodiments, the propulsion units can enable the movable object to take off vertically from a surface or land vertically on a surface without requiring any horizontal movement of the movable object (e.g., without traveling down a runway). Optionally, the propulsion units can be operable to permit the movable object to hover in the air at a specified position and/or orientation. The actuation can be controlled using suitable actuation signals, e.g., provided by a functional module that controls operation of the propulsion unit, as described in further detail herein. One or more of the propulsion units may be controlled independently of the other propulsion mechanisms. Alternatively, the propulsion units can be configured to be controlled simultaneously.

In some embodiments, the propulsion units of a movable object can include one or more rotors. Such rotors can be actuated (e.g., rotated) in a variety of ways in order to generate propulsive forces (e.g., lift forces, thrust forces) for effecting movement of the movable object. For example, a suitable actuator (e.g., engine or motor, such as a brushed DC motor or brushless DC motor) can be operably coupled to the rotor in order to drive the rotation of the rotor. The rotor can be a horizontal rotor (which may refer to a rotor having a horizontal plane of rotation), a vertically oriented rotor (which may refer to a rotor having a vertical plane of rotation), or a rotor tilted at an intermediate angle between the horizontal and vertical positions. In some embodiments, horizontally oriented rotors may spin and provide lift to the movable object. Vertically oriented rotors may spin and provide thrust to the movable object. Rotors oriented an intermediate angle between the horizontal and vertical positions may spin and provide both lift and thrust to the movable object. The forces generated by the rotation of the rotors can be of a sufficient magnitude to propel the movable object. In some embodiments, the rotors can be configured to spin at a rate suitable for generating the desired propulsive forces. The rotation rate can be based on the dimensions of the movable object (e.g., size, weight), and the movable object may have any suitable dimensions as described elsewhere herein.

One or more rotors may be used to provide a torque counteracting a torque produced by the spinning of another rotor. For example, a movable object can have multiple horizontally oriented rotors that are actuated (e.g., rotated) in order to provide lift and/or thrust to the movable object. The multiple horizontally oriented rotors can be actuated to provide vertical takeoff, vertical landing, and hovering capabilities to the movable object. In some embodiments, one or more of the horizontally oriented rotors may rotate in a clockwise direction, while one or more of the horizontally rotors may rotate in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the position, orientation, velocity, and/or acceleration of the movable object (e.g., with respect to up to three degrees of translation and up to three degrees of rotation).

FIG. 1 illustrates a multi-rotor UAV 100, in accordance with embodiments. The UAV 100 may be an example of a movable object as described herein. The UAV 100 can include four rotors 102, 104, 106, and 108. In alternative embodiments, any number of rotors may be provided (e.g., one, two, three, four, five, six, or more). The rotors can enable the unmanned aerial vehicle to hover/maintain position, change orientation, and/or change location. The distance between the centers of opposite rotors can be any suitable length 110. For example, the length 110 can be less than or equal to 2 m, or less than equal to 5 m. In some embodiments, the length 110 can be within a range from 40 cm to 1 m, from 10 cm to 2 m, or from 5 cm to 5 m.

As another example, the movable objects described herein can include one or more sensors configured to collect relevant data, such as information relating to the state of the movable object, the surrounding environment, or the objects within the environment. Exemplary sensors suitable for use with the embodiments disclosed herein include location sensors (e.g., global positioning system (GPS) sensors, mobile device transmitters enabling location triangulation), vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, inertial measurement units (IMUs)), altitude sensors, attitude sensors (e.g., compasses), pressure sensors (e.g., barometers), audio sensors (e.g., microphones) or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own energy source) and passive sensors (e.g., sensors that detect available energy). As another example, some sensors may generate absolute measurement data that is provided in terms of a global coordinate system (e.g., position data provided by a GPS sensor, attitude data provided by a compass or magnetometer), while other sensors may generate relative measurement data that is provided in terms of a local coordinate system (e.g., relative angular velocity provided by a gyroscope; relative translational acceleration provided by an accelerometer; relative attitude information provided by a vision sensor; relative distance information provided by an ultrasonic sensor, lidar, or time-of-flight camera). In some instances, the local coordinate system may be a body coordinate system that is defined relative to the movable object.

The sensors can be configured to collect various types of data, such as data relating to the movable object, the surrounding environment, or objects within the environment. For example, at least some of the sensors may be configured to provide data regarding a state of the movable object. The state information provided by a sensor can include information regarding a spatial disposition of the movable object (e.g., location or position information such as longitude, latitude, and/or altitude; orientation or attitude information such as roll, pitch, and/or yaw). The state information can also include information regarding motion of the movable object (e.g., translational velocity, translation acceleration, angular velocity, angular acceleration, etc.). A sensor can be configured, for instance, to determine a spatial disposition and/or motion of the movable object with respect to up to six degrees of freedom (e.g., three degrees of freedom in position and/or translation, three degrees of freedom in orientation and/or rotation). The state information may be provided relative to a global coordinate system or relative to a local coordinate system (e.g., relative to the movable object or another entity). For example, a sensor can be configured to determine the distance between the movable object and the user controlling the movable object, or the distance between the movable object and the starting point of flight for the movable object.

The data obtained by the sensors may provide various types of environmental information. For example, the sensor data may be indicative of an environment type, such as an indoor environment, outdoor environment, low altitude environment, or high altitude environment. The sensor data may also provide information regarding current environmental conditions, including weather (e.g., clear, rainy, snowing), visibility conditions, wind speed, time of day, and so on. Furthermore, the environmental information collected by the sensors may include information regarding the objects in the environment, such as information regarding the locations and geometries of environmental objects.

The movable object can include one or more functional modules that are operably coupled to one or more components in order to control the operation of the component(s). For example, the functional modules can include a propulsion control module coupled to a propulsion unit, a sensor control module coupled to a sensor, a communication control module coupled to a communication module, and so on. The functional module can be provided separately from the component and connected thereto. Alternatively, the functional module can be integrated with the component and provided as a single device. A functional module can include one or more processors operably coupled to memory storing executable instructions for the processors. The functional modules provided herein can transmit control signals to their corresponding component(s). Conversely, the functional module can receive information (e.g., state information, error information) from the component(s), e.g., as feedback. Any suitable number and combination of functional modules and components can be used. For instance, a single functional module can be coupled to any number of components, such as one, two, three, four, or more components. Similarly, a single component can be coupled to any number of functional modules, such as one, two, three, four, or more functional modules. A functional module can be connected to its corresponding component(s) in any suitable manner enabling communication, e.g., via electrical connectors such as wires, cables, or other types of connecting elements. Optionally, the functional module can be situated near the corresponding component(s), e.g., above, below, or to the side of the component(s), in order to facilitate the connections. The communication between the functional module and the component can utilize various types of communication signals, such as pulse-position modulation (PPM) signals, pulse width modulation (PWM) signals, chopper signals, input port signals, output port signals, or suitable combinations thereof.

For example, at least some of the functional modules described herein can be electronic speed control (ESC) modules. Any description herein of ESC modules can also be applied to other types of functional modules, and vice-versa. An ESC module can be operably coupled to an actuator (e.g., an electric motor) in order to control the operation of the actuator, e.g., with respect to rotation speed, rotation direction, acceleration, and/or braking. This control can be effected by transmission of control signals (e.g., PPM signals, PWM signals, chopper signals, input port signals, output port signals, etc.) generated and transmitted from the ESC module to the actuator. Conversely, the ESC module can receive signals from the actuator that are indicative of the actuator status (e.g., the speed, direction, acceleration, and/or braking of the actuator, error or fault information). Accordingly, an ESC module can be used to control the actuation of a propulsion unit in order to effect movement of a movable object (e.g., a UAV), as well as receive information regarding the operational status of the propulsion unit that can be used for monitoring or feedback purposes.

In some embodiments, the movable object includes a control module (also referred to herein as a "flight control module") that coordinates and controls the operation of the various components via the functional modules. Optionally, some of the components can be controlled directly by the control module without requiring an intermediary functional module. The control module can include one or more processors operably coupled to memory storing executable instructions for the processors. The control module can be carried by the movable object. In some embodiments, the control module is positioned on or within a housing and/or body of the movable object (e.g., a vehicle body). Alternatively, the control module can be located at a remote system or device in communication with the movable object. The control module can be configured to operate autonomously, semi-autonomously, under the control of one or more users, or suitable combinations thereof.

The control module can transmit commands to one or more functional modules and/or receive information from one or more functional modules. The control module can be configured to communicate with multiple functional modules simultaneously or in parallel. Alternatively, the control module can be configured to communicate with a single functional module at a time, such that communications between the control module and multiple functional modules occur sequentially. In some embodiments, the control module can be operably coupled to one or more functional modules using a master/slave configuration, in which the control module operates as the master device and the functional modules operate as slave devices. In such a configuration, the control module can initiate communication by transmitting commands to the functional modules, and the functional modules can transmit information to the control module only in response to received commands. In alternative embodiments, the functional modules can initiate communication with the control module without first receiving a command.

The communication between the control module and the functional modules can occur via one or more communication interfaces. A communication interface can include various components used to facilitate communication between devices, such as receivers, transmitters, transceivers, input ports, output ports, connecting elements (e.g., wires, cables, fibers), and the like. A communication interface can be unidirectional, in that signals are transmitted via the interface in one direction only (e.g., signals are transmitted from the control module to the functional module only or vice-versa). Alternatively, a communication interface can be bidirectional, such that signal transmission via the interface occurs in both directions. The communication interface can be a private communication interface so as to couple the control module to only a single functional module. Alternatively, the communication interface can be a shared communication interface connecting the control module to multiple functional modules. In some embodiments, a functional module is coupled to the control module using a plurality of communication interface of different types. For instance, the functional module can be coupled to the control module via a bidirectional shared communication interface and a unidirectional private communication interface allowing transmission from the control module to the functional module only. In some embodiments, the bidirectional shared communication interface is a bus interface including a bus such as a 485 bus, I2C bus, SPI bus, CAN bus, or suitable combinations thereof. In some embodiments, the unidirectional private communication interface is a PPM signal line, a PWM signal line, an analog voltage signal line, or a digital voltage signal line. Optionally, different communication interfaces can be used for different types of communication, as described in further detail below.

Figure 2:
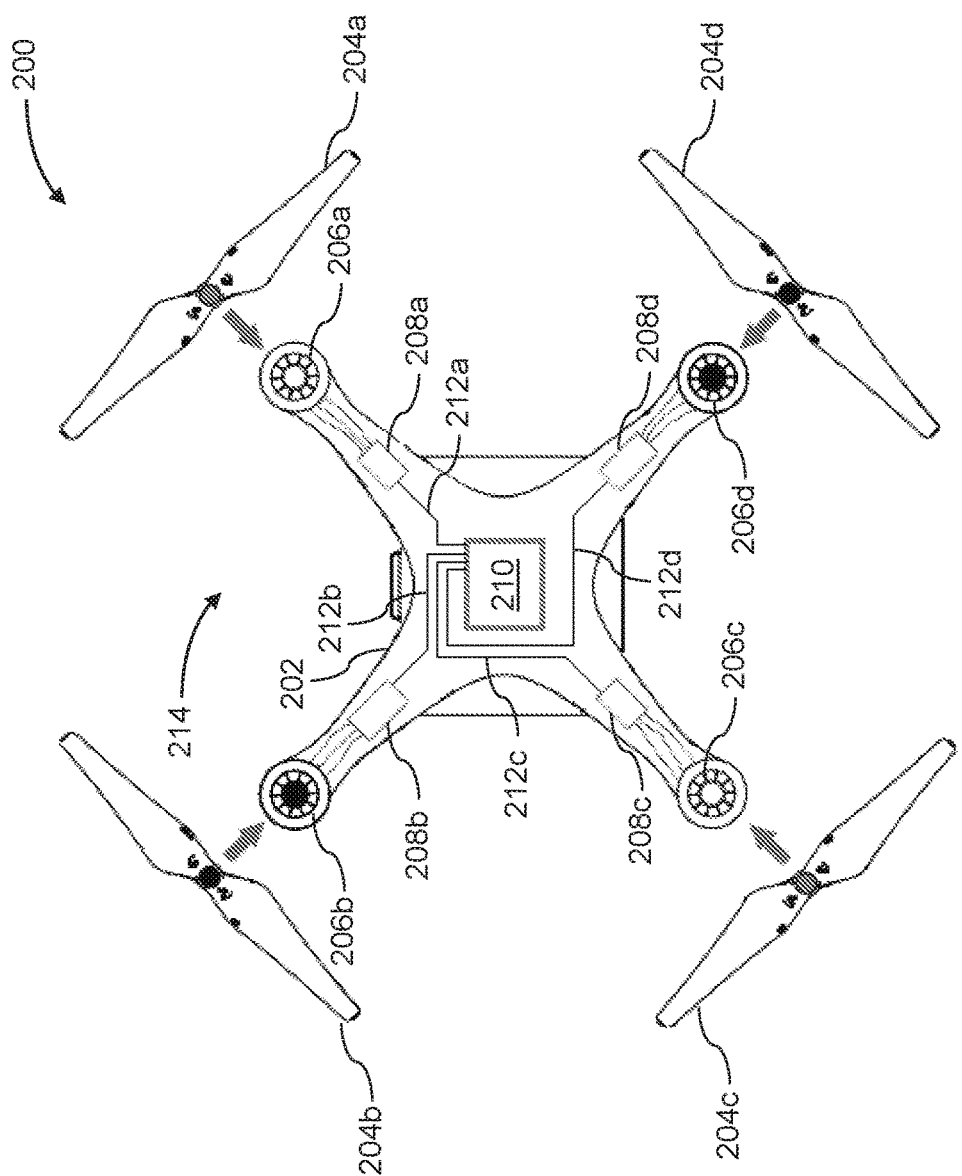
FIG. 2 illustrates a multi-rotor UAV having a plurality of electronic speed control (ESC) modules, in accordance with embodiments.

FIG. 2 illustrates a multi-rotor UAV 200 having a plurality of ESC modules, in accordance with embodiments. The UAV 200 includes a vehicle body 202 and a plurality of propulsion units coupled to the vehicle body 202. In the embodiment of FIG. 2, the UAV 200 includes four rotors 204a-d, each coupled to a corresponding actuator 206a-d. Each actuator 206a-d can be operably coupled to a corresponding ESC module 208a-d, e.g., via electrical connections such as wires or cables. The four ESC modules 208a-d can transmit control signals to their corresponding actuators 206a-d in order to control the rotation rate and/or rotation direction of the coupled rotor 204a-d. In turn, the ESC modules 208a-d can be coupled to a flight control module 210 via respective private communication interfaces 212a-d such as PPM signal lines. In some embodiments, the private communication interfaces 212a-d are unidirectional interfaces, such that signals (e.g., PPM signals) are transmitted from the flight control module 210 to the ESC modules 208a-d only. The flight control module 210 can transmit control signals via the private communication interfaces 212a-d to the ESC modules 208a-d, which can subsequently generate and transmit actuation signals to the corresponding actuators 206a-d in order to drive rotation of the rotors 204a-d. The control module 210 can communicate independently with each of the ESC modules 208a-d in order to independently control each of the rotors 204a-d.

Figure 3:
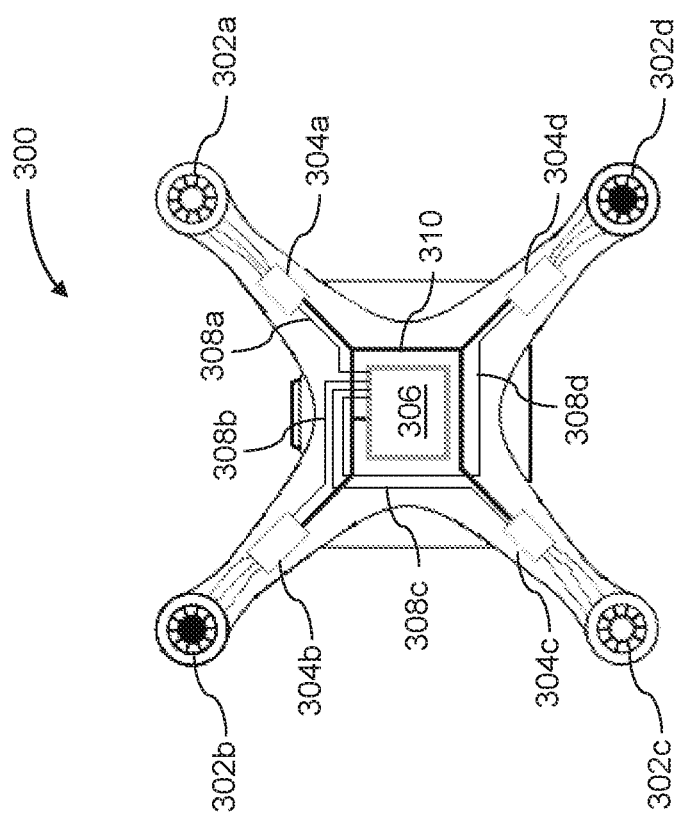
FIG. 3 illustrates a multi-rotor UAV having a plurality of electronic speed control (ESC) modules, in accordance with embodiments.

FIG. 3 illustrates a multi-rotor UAV 300 having a plurality of ESC modules, in accordance with embodiments. Similar to the UAV 200, the UAV 300 includes four actuators 302a-d each used to drive the rotation of a respective rotor (not shown) and four ESC modules 304a-d each coupled to a corresponding actuator. The ESC modules 304a-d are coupled to a flight control module 306 via respective unidirectional private communication interfaces 308a-d (e.g., PPM signal lines) that can be used to transmit signals for controlling the actuators 302a-d, as previously described herein. However, unlike the UAV 200, the UAV 300 also includes a bidirectional shared communication interface 310 (e.g., a bus interface) coupling the flight control module 306 to each of the ESC modules 304a-d. This configuration enables the ESC modules 304a-d to transmit information to the flight control module 306 and vice-versa. For example, the flight control module 306 can transmit queries for information to the ESC modules 304a-d via the shared communication interface 310, and the ESC modules 304a-d can respond to the queries via the shared communication interface 310. In some embodiments, the ESC modules 304a-d are coupled to the shared communication interface 310 in parallel. This arrangement can permit addition and/or removal of any number of ESC modules to the shared interface 310.

Figure 4:
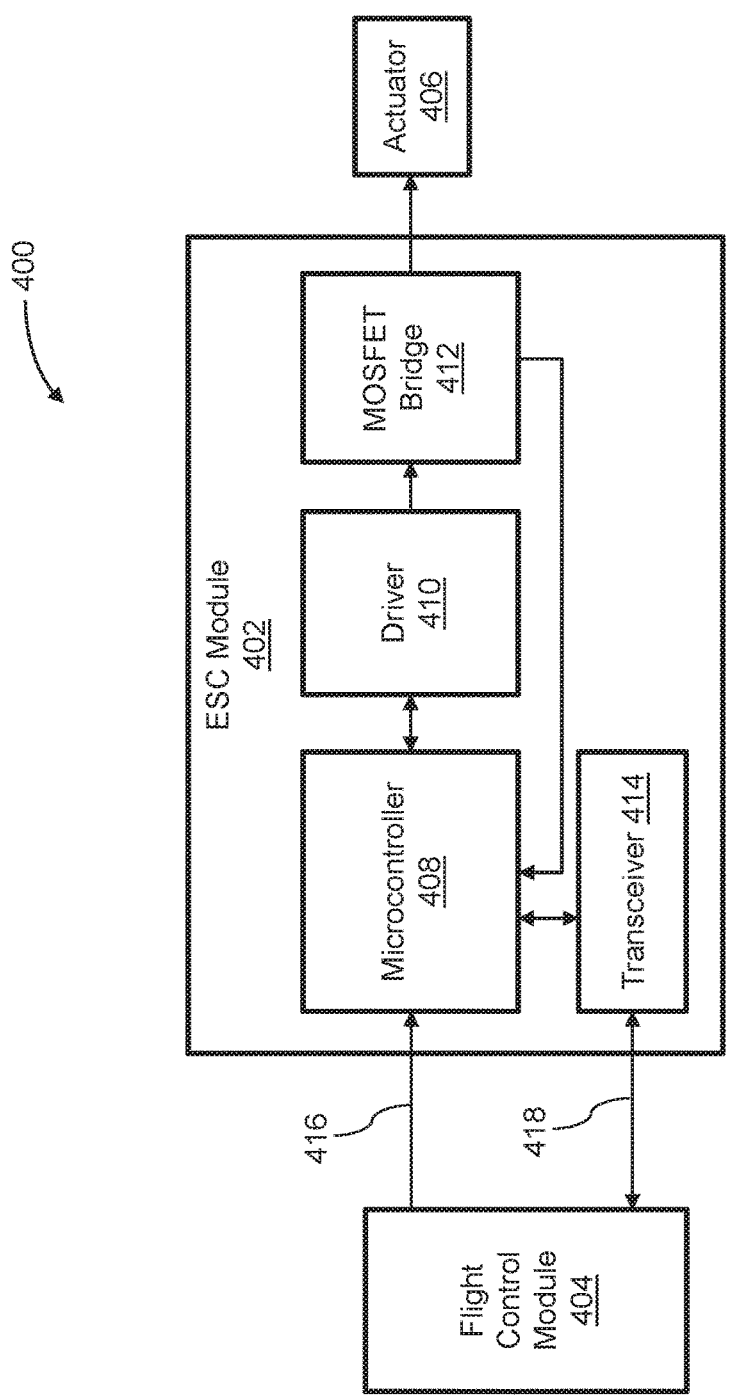
FIG. 4 illustrates a system for controlling an actuator of a movable object, in accordance with embodiments.

FIG. 4 illustrates a system 400 for controlling an actuator of a movable object, in accordance with embodiments. The system 400 can be used in combination with any of the systems and devices provided herein, such as the UAV 300. The system 400 includes an ESC module 402 operably coupled to a flight control module 404 and an actuator 406 (e.g., a brushless motor). In some embodiments, the ESC module 402 includes a microcontroller 408, a driver 410 (e.g., a MOSFET driver chip), a MOSFET bridge 412 (e.g., a three-phase full bridge MOSFET circuit), and a transceiver 414. In alternative embodiments, the ESC module 402 includes other types of power transistors instead of MOSFETs, e.g., bipolar transistors and/or IGBTs. The microcontroller 408 can include one or more processors, memory storing executable instructions for the processors, and one or more input and/or output ports for communicating with other devices. The microcontroller 408 can be used to perform a variety of tasks related to the operation of the ESC module 402, such as implementation of algorithms for controlling the actuator 406 and processing of communication signals received from the flight control module 404.

In some embodiments, the flight control module 404 is coupled to the microcontroller 408 via a first communication interface 416, such as a PPM signal line. The first communication interface 416 can be a unidirectional and/or private communication interface used to transmit control signals from the flight control module 404 to the microcontroller 408, as previously described herein. The microcontroller 408 can process the control signals to generate corresponding actuation signals that are transmitted to the driver 410. The driver 410 can drive the MOSFET bridge 412 based on the received actuation signals in order to control switching of the MOSFET bridge 412, thereby generating the appropriate waveforms for controlling actuation (e.g., rotation speed, rotation direction, acceleration, braking) of the actuator 406. Additionally, the driver 410 can be coupled to a power source (not shown) to control the power applied to the MOSFET bridge 412 and/or actuator 406. The microcontroller 408, driver 410, MOSFET bridge 412, and actuator 406 can be coupled to each other using one or more communication interfaces in order to enable transmission of actuation signals from the ESC module 402 to the actuator 406. Optionally, these communication interfaces can enable the driver 410 and/or the MOSFET bridge 412 to transmit information to the microcontroller, e.g., information regarding the state of the drive 410, MOSFET bridge 412, and/or actuator 406, error or fault information, and the like. Such information can be provided in any suitable format, such as analog voltage signals or digital voltage signals.

In some embodiments, the transceiver 414 of the ESC module 402 is used to couple the microcontroller 408 to the flight control module 404 via a second communication interface 418. The transceiver 414 can be provided as a separate device that is connected to the microcontroller 408. Alternatively, the transceiver 414 can be integrated into the microcontroller 408, such that no external connections are required. The transceiver 414 can be adapted to convert communication signals generated by the flight control module 404 into a format useable by the microcontroller 408, and vice-versa. For example, in embodiments where the microcontroller 408 is configured to output universal asynchronous receiver/transmitter (UART) signals and the second communication interface 418 is a 485 bus, the transceiver 414 can convert the UART signals output by the microcontroller 408 into 485 bus signals, and vice-versa. Accordingly, the transceiver 414 can be used to enable bidirectional communication between the ESC module 402 and the flight control module 404 via the second communication interface 418. Various types of information can be communicated between the ESC module 402 and flight control module 404 via the second communication interface 418. For instance, the flight control module 404 can transmit commands to the ESC module 402 for controlling the microcontroller 408, driver 410, MOSFET bridge 412, and/or actuator 406. Conversely, the ESC module 402 can transmit state information to the flight control module 404, such as state information relating to microcontroller 408, driver 410, MOSFET bridge 412, and/or actuator 406.

The use of bidirectional communication interfaces between a control module and one or more functional modules described herein can facilitate control and operation of the movable object. In some embodiments, the implementation of such bidirectional communication permits the control module to receive feedback from the functional module and/or the component controlled by the functional module, such as state information relating to the current operational status and/or fault information. For example, referring again to the embodiment of FIG. 4, the ESC module 402 can use the second communication interface 418 to transmit information relating to one or more of the following: the rotation speed of the actuator 406, the rotation direction of the actuator 406, the operational status of the ESC module 402, the value of the electric current for the ESC module 402 or one or more components thereof, or fault information for the actuator 406 and/or ESC module 402 or one or more components thereof. In some embodiments, the control module can periodically poll the functional module by transmitting command signals comprising requests or queries for the state information at predetermined time intervals. The predetermined time interval can range from about once every 0.0001 s to about once every 1 s. For example, the predetermined time interval can be about once every 0.0001 s, 0.0005 s, 0.001 s, 0.005 s, 0.01 s, 0.05 s, 0.1 s, 0.5 s, or 1 s.

The information received by the control module from the functional module can be used in a variety of ways. For example, the control module can store some or all of the information in an operably coupled memory, e.g., an internal memory or an external memory. As another example, the control module can use at least some of the information in determining a control scheme for the movable object, e.g., modifying a current control scheme, changing to a different control scheme, maintaining a current control scheme, and so on. In some embodiments, the received information serves as feedback for control algorithms implemented by the control module. In yet another example, the control module can transmit some or all of the information to another device or system in communication with the movable object, such as a remote terminal, remote controller, or computer. Such devices or systems can process the information, e.g., to perform fault analysis. Optionally, the device or systems can display the information to a user via a suitable display unit (e.g., screen, monitor, touchscreen). This approach can be beneficial for allowing the user to directly monitor the current state of the functional module.

Figure 5:
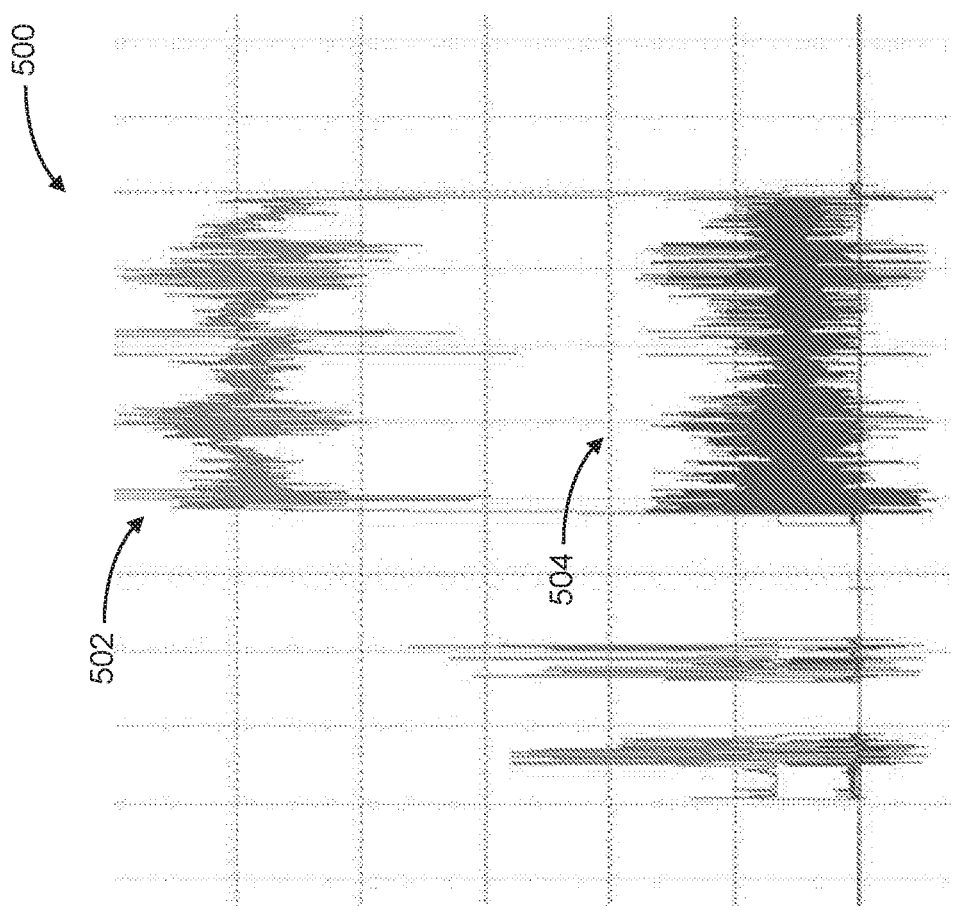
FIG. 5 illustrates a display for displaying state information provided by an ESC module, in accordance with embodiments.

FIG. 5 illustrates a display 500 for displaying state information provided by an ESC module, in accordance with embodiments. The display 500 includes a graph 502 depicting the rotational speed of an actuator coupled to the ESC module and a graph 504 depicting the current through the ESC module. In alternative embodiments, the information can be displayed in other formats, e.g., graphics, video, audio, text, or suitable combinations thereof. The displayed information can be transmitted from the ESC module to a control module via a bidirectional communication interface, as previously described herein, and subsequently transmitted by the control module to a user device. Optionally, the displayed information can be updated in real time or approximately real time during operation of the movable object. Accordingly, a user can view the display 500 in order to assess the current status of the ESC module and/or actuator. This approach can be particularly advantageous in the context of fault detection and error analysis, in that the user can directly view the information output by the ESC module to diagnose the error, rather than having to indirectly infer errors in the ESC module, e.g., based on the behavior of the movable object and/or alert indicators such as warning lights.

As previously described herein, in some embodiments, the bidirectional communication interfaces described herein are shared communication interfaces (e.g., bus interfaces) that couple the control module to a plurality of different functional modules. In such embodiments, commands transmitted by the control module over the shared communication interface are received by all of the functional modules connected to the interface. In order to ensure that the appropriate functional module is responding to the command, each functional module connected to the shared interface can be assigned an identifier, also referred to herein as an address. The address can be a sequence of alphabetical and/or numeric characters, such as a binary number, a hexadecimal number, an octal number, or a decimal number. In some embodiments, each functional module can have a different address. Alternatively, some of the functional modules can have the same address. The address can be stored in a memory associated with the functional module, such as a random access memory (RAM), read only memory (ROM), erasable programmable read only memory (EEPROM), or flash memory. The commands transmitted by the control module can include the address of the intended recipient(s), thereby providing a mechanism by which the functional modules can determine whether or not to respond to a received command. Accordingly, the use of addresses as described herein can enable the control module to individually control each functional module even when transmitting commands over a shared communication interface. Moreover, the responses generated by the functional modules can include the address of the sender, thereby allowing the control module to distinguish between communications transmitted by different functional modules.

Figure 6:
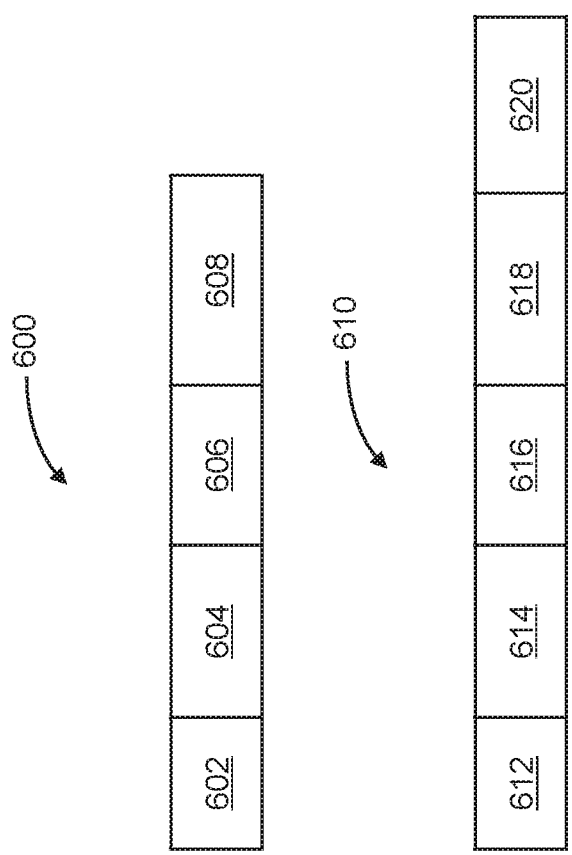
FIG. 6 illustrates messages used for communication between a control module and a plurality of functional modules over a shared communication interface, in accordance with embodiments.

FIG. 6 illustrates messages used for communication between a control module and a plurality of functional modules over a shared communication interface, in accordance with embodiments. The messages can be provided as data packets or in any other suitable format. The message 600, which may also be referred to herein as a "command message," "command signal," or "control signal," can be generated by a control module and used to control one or more functional modules. The message 600 includes a plurality of parts, such as a header 602, a command 604, an address 606, and a checksum 608. The order of the parts can be varied as desired. At least some of the parts can be optional. The header 602 can include various types of information, such as supplemental information regarding the format and/or protocol for the message. The command 604 can indicate an operation to be carried out by the recipient of the message 600. The command 604 can be represented by a number, e.g., an octet such as 0xA1. The address 606 can indicate the recipient(s) of the message 600. The address 606 can be a number, e.g., an octet such as 0x01. Accordingly, when the message 600 is received by a plurality of functional modules, only the functional module having the address 606 will perform the command 604 specified by the message 600, while the other functional modules will simply disregard the message 600. The checksum 608 can be used to detect errors in signal transmission.

The message 610, which may also be referred to herein as a "response message" or a "response signal," can be generated by a functional module and used to respond to a command from a control module. The message 610 includes a plurality of parts, such as a header 612, a command 614, an address 616, a response 618, and a checksum 620. The order of the parts can be varied as desired. At least some of the parts can be optional. The header 612 and checksum 620 can be similar to the header 602 and checksum 608 of the message 600 described above. The command 614 can indicate which command the message 610 is responding to. The address 616 can indicate the address of the responding functional module. The response 618 can include information requested by the control module. For example, in embodiments where the message 610 is generated by ESC module in response to a query for state information, the response 618 can include the state information provided by the ESC module, such as rotation speed of an actuator controlled by the ESC module, the electrical current through the ESC module, and a code indicating the operational status of the ESC module (e.g., normal or abnormal). As another example, in embodiments where the message 610 is generated by ESC module in response to a command to perform an operation, the response 618 can provide a confirmation that the operation was successfully performed.

The process of assigning addresses to one or more functional modules may be referred to herein as "addressing." The address to be assigned to each functional module can be determined in a variety of ways. In some embodiments, the address of each functional module is based on the physical location of each module. For example, referring again to the embodiment of FIG. 2, the addresses of each of the ESC modules 208*a-d* can be determined based on their positions relative to the front 214 of the UAV 200 (e.g., the ESC module 208*a* is designated #1, the ESC module 208*b* is #2, the ESC module 208*c* is #3, and the ESC module 208*d* is #4). This approach may be advantageous in situations where the physical locations of the controlled components are significant, e.g., when controlling propulsion units of a UAV in order to control the movement direction of the UAV. Alternatively, the addressing can be based on other factors (e.g., module type, user preference) or can be arbitrary.

In some embodiments, the addresses described herein may include static addresses that are invariant. A static address may not change during operation of the movable object or when the movable object is turned on or off. The use of static addresses may be appropriate when the physical positions of the functional modules are fixed, e.g., affixed to a single circuit board. In such embodiments, the static address can be assigned prior to the first use of the movable object, e.g., by a manufacturer of the functional module and/or movable object. Various techniques can be used to assign static addresses to functional modules. For example, the static address can be encoded or "burned" within the software or firmware of the functional module, such that each functional module has a predetermined address. As another example, the static addresses can be assigned by configuring one or more hardware components of the functional modules to uniquely identify each module. For example, in embodiments where the functional modules each include a microcontroller, the voltages of certain microcontroller pins can be set to predetermined values. The hardware-based approach advantageously permits the use of identical software or firmware within each of the functional modules.

Figure 7:
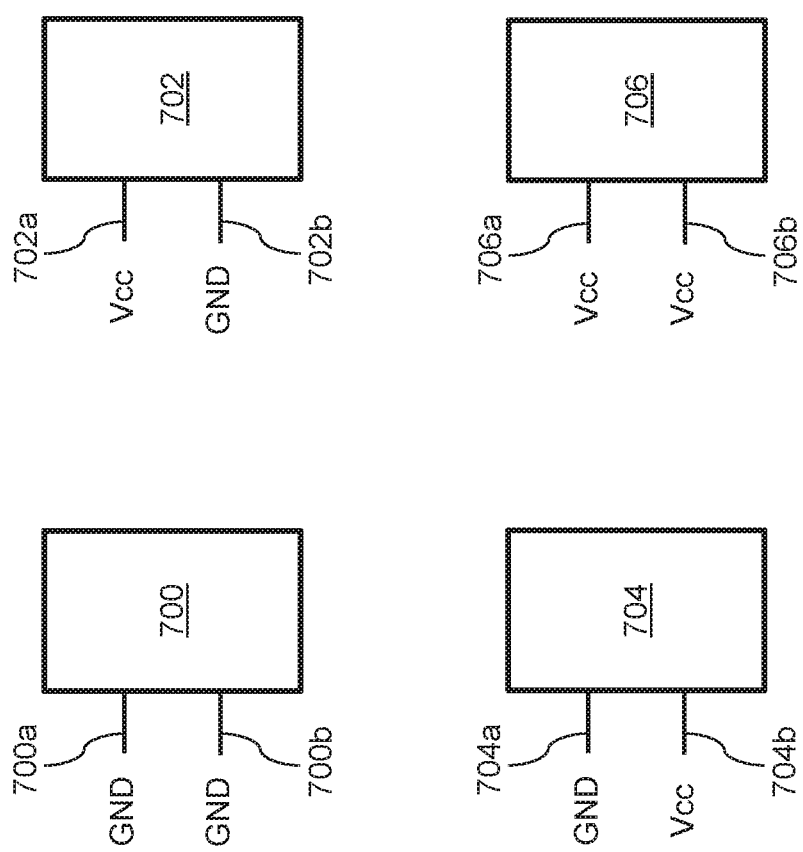
FIG. 7 illustrates a scheme for static addressing of a plurality of functional modules based on microcontroller pin configurations, in accordance with embodiments.

FIG. 7 illustrates a scheme for static addressing of a plurality of functional modules based on microcontroller pin configurations, in accordance with embodiments. Each of the functional modules includes a respective microcontroller chip 700, 702, 704, 706. The microcontroller chips 700, 702, 704, 706 can be similar to the microcontroller 408 previously described herein with respect to FIG. 4. Each microcontroller chip can include at least two pins used for addressing, 700*a-b*, 702*a-b*, 704*a-b*, 706*a-b*. The voltages of the pins of each microcontroller chip can be set to different combinations of high values (e.g., supply voltage $V_{CC}$) or low values (e.g., ground) in order to uniquely identify each chip. For example, in the embodiment of FIG. 7, the pins 700*a-b* are both set to ground, pin 702*a* can be set to $V_{CC}$ while pin 702*b* is set to ground, pin 704*a* is set to ground while pin 704*b* is set to $V_{CC}$, and pins 706*a-b* are both set to $V_{CC}$. The pin configurations can be used to identify the corresponding functional module, e.g., microcontroller chip 700 corresponds to ESC module #1, chip 702 corresponds to ESC module #2, chip 704 corresponding to ESC module #3, and chip 706 corresponds to ESC module #4.

In alternative embodiments, the addresses described herein may include dynamic addresses that can be changed during operation of the movable object or when the movable object is turned on or off. For example, dynamic addressing can occur each time the movable object is turned on. The dynamic address can be stored in a memory associated with the functional module, such as RAM, ROM, EEPROM, or flash memory. The use of dynamic addresses may be appropriate in situations where the physical positions of the functional modules can vary, e.g., when the user replaces or changes individual modules. This approach enables each functional module to utilize the same software or firmware without requiring different hardware configurations for each module, which can be particularly advantageous when large numbers of functional modules are used.

Dynamic addressing can be performed by using the control module to transmit an addressing signal that includes the address to be assigned. In some embodiments, this addressing signal is transmitted over a shared communication interface and received by a plurality of functional modules. In order to ensure that the address is assigned only to the desired functional module, the desired functional module be activated for addressing prior to transmission of the addressing signal. In some embodiments, when an addressing signal is received, only the activated functional module will respond and assign the address, while unactivated functional modules will disregard the addressing signal. Accordingly, each functional module can be activated and addressed in turn.

Figure 8:
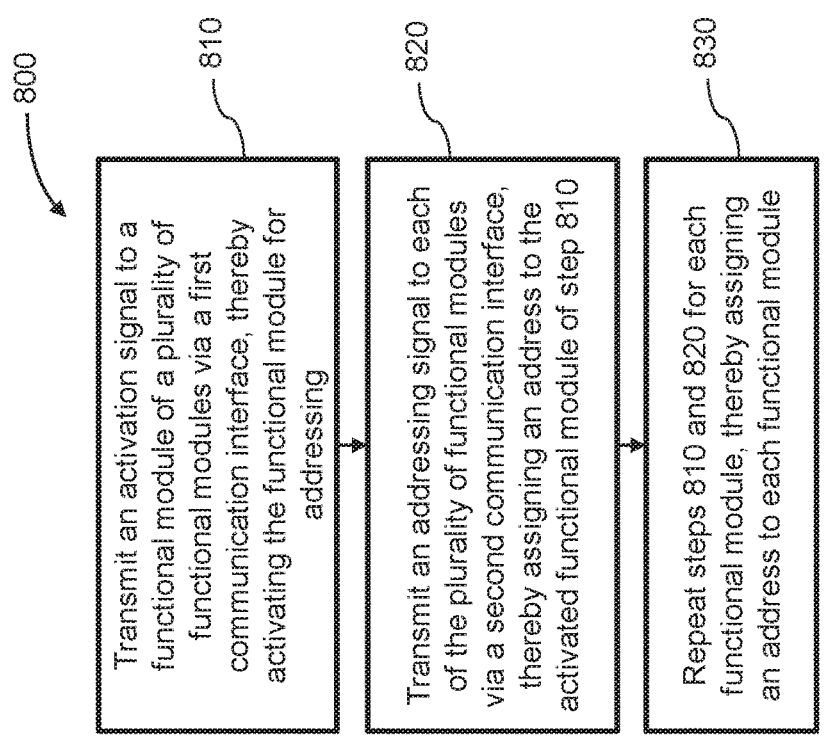
FIG. 8 illustrates a method for dynamic addressing of a plurality of functional modules, in accordance with embodiments.

FIG. 8 illustrates a method 800 for dynamic addressing of a plurality of functional modules, in accordance with embodiments. The method 800, as with all other methods described herein, can be practiced by any embodiment of the systems and devices provided herein. In some embodiments, some or all of the steps of the method 800 are performed by a control module operably coupled to a plurality of functional modules. In some embodiments, the control module includes a memory storing executable instructions for performing the method 800 and one or more processors configured to individually or collectively execute the instructions. The control module can be coupled to the plurality of functional modules via a plurality of respective private communication interfaces and a shared communication interface. The plurality of functional modules can be carried by a movable object and adapted to control components of the movable object, as previously described herein. For example, the functional modules can be ESC modules each operably coupled to a propulsion unit.

In step 810, an activation signal is transmitted to a functional module of a plurality of functional modules via a first communication interface, thereby activating the functional module for addressing. Any suitable type of communication interface can be used for the first communication interface, such as PPM signal line, a PWM signal line, an analog voltage signal line, or a digital voltage signal line. The first communication interface can be a private communication interface that couples the control module to only the selected functional module, such that the activation signal is received only by the selected functional module and is not transmitted to any other functional module. Optionally, the first communication interface can be a unidirectional interface in which data is transmitted from the control module to the functional module. For example, in embodiments where the functional module is an ESC module, the first communication interface can be a PPM signal line used to transmit control signals for controlling an actuator coupled to the ESC module. The activation signal can be a PPM signal that is distinct from the actuator control signals, e.g., of a different pulse width and/or period. For example, the activation signal can be a PPM signal pulse having a width of about 500 µs and a period of about 2500 µs, while the actuator control signals can have a width of about 1120 µs to about 1920 µs and a period of about 2500 µs. Receipt of the activation signal causes the functional module to enter a state in which it can be addressed, which may also be referred to herein as an "encoding state." For instance, the ESC module can calculate the width of the PPM signals it receives to determine whether the signal is an activation signal or an actuator control signal. If the ESC module receives a predetermined number of successive activation signals (e.g., one, two, three, four, five, or more successive activation signals), it can then enter the encoding state.

In step 820, an addressing signal comprising an address is transmitted to each of the plurality of functional modules via a second communication interface, thereby assigning the address to the functional module activated in step 810. In some embodiments, the second communication interface is different and separate from the first communication interface. The second communication interface can be a shared bidirectional communication interface, such as a bus interface. The addressing signal can be a message similar to the message 600 of FIG. 6, with the command 604 being an addressing command and the address 606 indicating the address to be assigned. In some embodiments, although the addressing signal is received by all of the functional modules coupled to the shared communication interface, only the activated functional module will respond to the command by setting the received address as its address, e.g., by storing the address in an associated memory such as RAM. The newly addressed functional module can transmit a confirmation signal to the control module confirming the successful addressing. For instance, the confirmation signal can be similar to the message 610 of FIG. 6, with the command 614 indicating that the message 610 is responding to the addressing command, the address 616 being the newly assigned address, and the response 618 indicating that the addressing command was successful.

Optionally, the address is only assigned to the activated functional module if the activated functional module does not already have an assigned address. Accordingly, a functional module that has already been activated and addressed can disregard additional addressing signals unless a new activation signal is received. In alternative embodiments, the address is assigned even if the functional module already has an address, thus replacing the previous address.

In step 830, steps 810 and 820 are repeated for each functional module of the plurality of functional modules, thereby assigning an address to each functional module. Accordingly, the control module can activate each functional module in turn using an activation signal sent over a private communication interface to the functional module, then address the activated functional module using an addressing signal transmitted over the shared communication interface. Upon receipt of confirmation that the addressing was successfully performed, the control module can proceed with activating and addressing the next functional module. If the addressing was not successfully performed, the control module can attempt to repeat the addressing procedure and/or report the error, e.g., to a remote terminal or controller. Once each functional module has been addressed, the control module can then proceed to control each module using addressed commands, as previously described herein.

Figure 9:
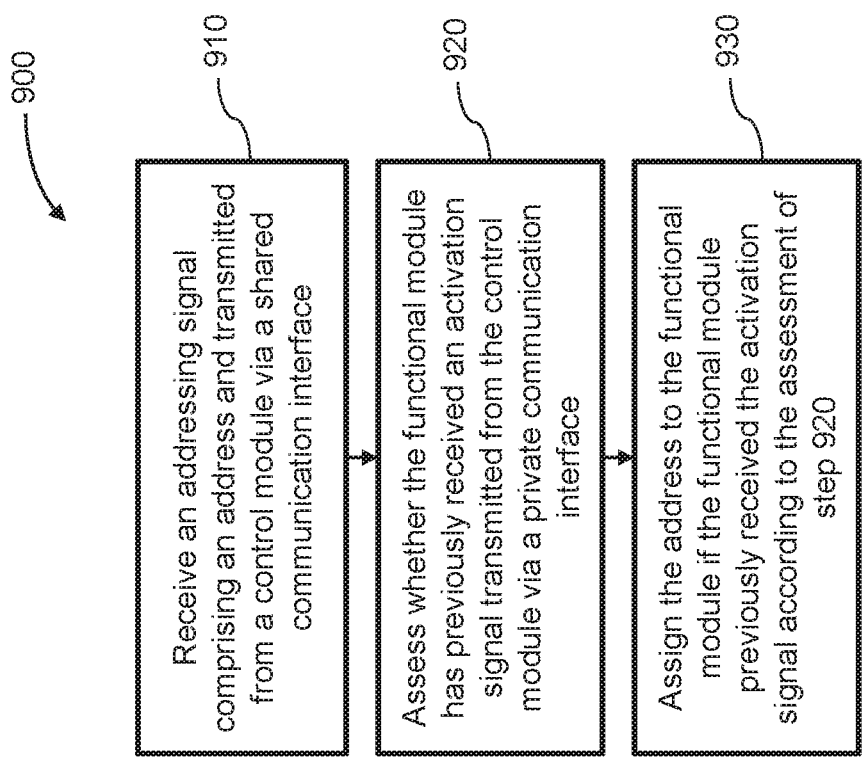
FIG. 9 illustrates a method for dynamic addressing of a functional module, in accordance with embodiments.

FIG. 9 illustrates a method 900 for dynamic addressing of a functional module, in accordance with embodiments. One or more steps of the method 900 can be performed by a functional module adapted to control a component of a movable object, such as an ESC module for controlling a propulsion unit of a UAV. In some embodiments, the functional module includes a memory storing executable instructions for performing the method 800 and one or more processors configured to individually or collectively execute the instructions. The memory and processor(s) can be components of a microcontroller, such as the microcontroller 408 of FIG. 4. The functional module can be one of a plurality of functional modules carried by the movable object and adapted to control one or more components of the movable object, as previously described herein.

In step 910, an addressing signal comprising an address is received. The addressing signal can be transmitted from a control module via a shared communication interface, such as a bus interface. The addressing signal can be similar to the addressing signal previously described herein in step 820 of the method 800.

In step 920, an assessment is performed in order to determine whether the functional module has previously received an activation signal. The activation signal can have been previously transmitted by the control module via a private communication interface, such as a PPM signal line. The activation signal can be similar to the activation signal previously described herein with respect to step 810 of the method 800. Various approaches can be used to determine if the functional module previously received the activation signal. For example, in some embodiments, receipt of the activation signal causes a state change in the functional module, and the assessment can be performed by evaluating the current state of the functional module. As another example, the functional module can store information indicating that the activation signal was received, and the assessment can be performed by retrieving the information.

In step 930, the address is assigned to the functional module if the functional module previously received the activation signal according to the assessment of step 920. The address can be assigned by storing the address in a memory associated with the functional module, e.g., a memory of the microcontroller 408 of FIG. 4. If the assessment of step 920 indicated that the activation signal was not previously received, the functional module can instead take no action and not assign the address. In some embodiments, the step 920 is optional, in that the functional module responds automatically to the addressing signal based on whether the activation signal was previously received without requiring that the assessment.

In some embodiments, the address is only assigned if the functional module does not already have an assigned address. Accordingly, a functional module that has already been activated and addressed can disregard additional addressing signals unless a new activation signal is received. In alternative embodiments, the address is assigned even if the functional module already has an address, thus replacing the previous address. The functional module can transmit a confirmation of successful addressing to the control module via the shared interface following the assignment, as previously described herein.

The dynamic addressing methods described herein can be performed at any suitable time prior to, during, or after operation of the movable object. In embodiments where the assigned addresses are stored in RAM, the addresses are retained up until the movable object is powered off. Accordingly, the dynamic addressing procedure can be performed each time the movable object is powered on, e.g., as part of an initialization process. In such embodiments, modifications to the configuration of the functional modules can be accommodated by simply powering off the movable object, changing or replacing functional modules as desired, then powering on the movable object to initiate the addressing procedure. Optionally, the addressing procedure can also be performed during operation of the movable object when the movable object is already powered on, e.g., automatically or in response to user instructions. Advantageously, the approaches described herein permit facile, rapid, and versatile addressing of any number and combination of functional modules as desired.

Once each functional module has been assigned address in accordance with the embodiments presented herein, the control module can then proceed to issue commands to the various functional modules via addressed messages transmitted over the shared communication interface, as previously described herein. For example, the control module can periodically poll one or more of the functional modules by transmitting a query signal requesting state information to each module via the shared communication interface. The query signal can include an address indicating the intended recipient of the query. Each functional module can assess the received query signal to determine whether the address specified in the query matches the assigned address of the functional module. If the address matches, the functional module can respond to the query by transmitting a response with the requested state information to the control module. If the address does not match, the functional module can disregard the query. This polling process can be repeated at predetermined time intervals in order to obtain updated information regarding the current state of the functional module and/or the corresponding components. The predetermined time interval can range from about once every 0.0001 s to about once every 1 s. For example, the predetermined time interval can be about once every 0.0001 s, 0.0005 s, 0.001 s, 0.005 s, 0.01 s, 0.05 s, 0.1 s, 0.5 s, or 1 s.

The systems, devices, and methods described herein can be applied to a wide variety of movable objects. As previously mentioned, any description herein of an aerial vehicle may apply to and be used for any movable object. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include avians, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 10:
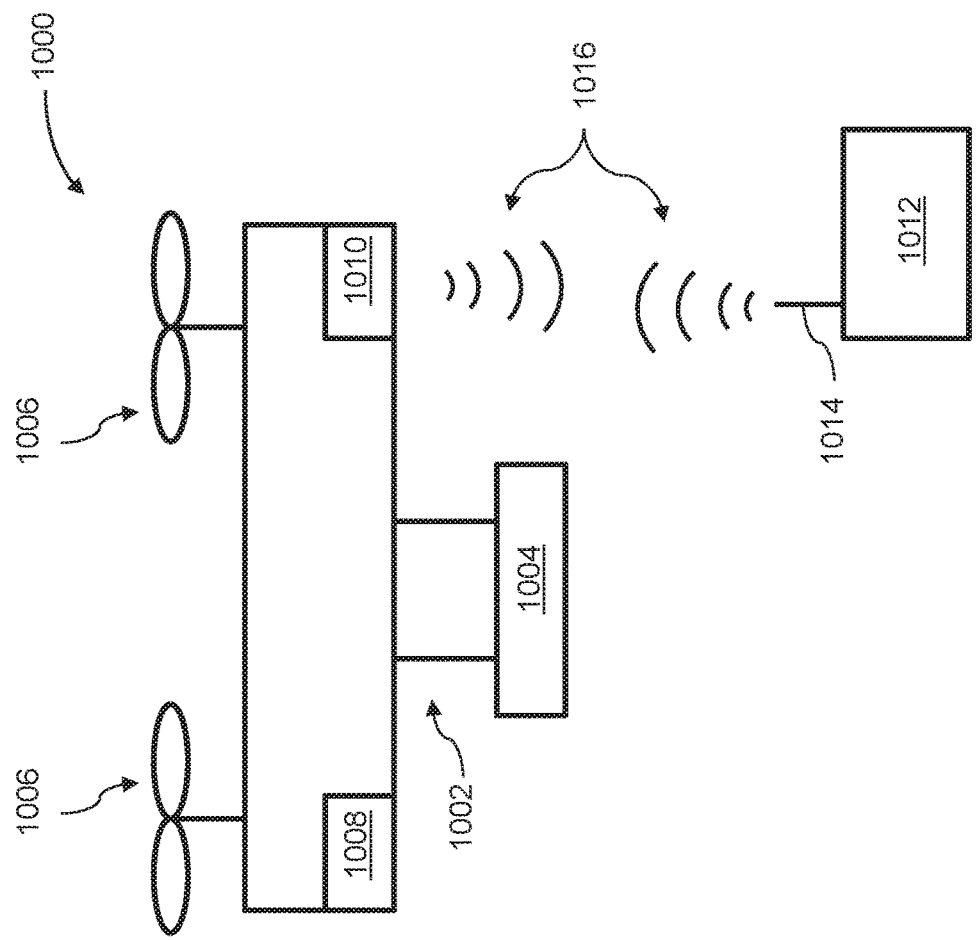
FIG. 10 illustrates a movable object including a carrier and a payload, in accordance with embodiments.

FIG. 10 illustrates a movable object 1000 including a carrier 1002 and a payload 1004, in accordance with embodiments. Although the movable object 1000 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1004 may be provided on the movable object 1000 without requiring the carrier 1002. The movable object 1000 may include propulsion mechanisms 1006, a sensing system 1008, and a communication system 1010. The propulsion mechanisms 1006 can include one or more of rotors, propellers, blades, engines, motors, wheels, axles, magnets, or nozzles, as previously described.

The sensing system 1008 can include one or more sensors that may sense the spatial disposition, velocity, and/or acceleration of the movable object 1000 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1008 can be used to control the spatial disposition, velocity, and/or orientation of the movable object 1000 (e.g., using a suitable processing unit and/or control module, as described below). Alternatively, the sensing system 1008 can be used to provide data regarding the environment surrounding the movable object, such as weather conditions, proximity to potential obstacles, location of geographical features, location of manmade structures, and the like.

The communication system 1010 enables communication with terminal 1012 having a communication system 1014 via wireless signals 1016. The communication systems 1010, 1014 may include any number of transmitters, receivers, and/or transceivers suitable for wireless communication. The communication may be one-way communication, such that data can be transmitted in only one direction. For example, one-way communication may involve only the movable object 1000 transmitting data to the terminal 1012, or vice-versa. The data may be transmitted from one or more transmitters of the communication system 1010 to one or more receivers of the communication system 1012, or vice-versa. Alternatively, the communication may be two-way communication, such that data can be transmitted in both directions between the movable object 1000 and the terminal 1012. The two-way communication can involve transmitting data from one or more transmitters of the communication system 1010 to one or more receivers of the communication system 1014, and vice-versa.

In some embodiments, the terminal 1012 can provide control data to one or more of the movable object 1000, carrier 1002, and payload 1004 and receive information from one or more of the movable object 1000, carrier 1002, and payload 1004 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1006), or a movement of the payload with respect to the movable object (e.g., via control of the carrier 1002). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1008 or of the payload 1004). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1012 can be configured to control a state of one or more of the movable object 1000, carrier 1002, or payload 1004. Alternatively or in combination, the carrier 1002 and payload 1004 can also each include a communication module configured to communicate with terminal 1012, such that the terminal can communicate with and control each of the movable object 1000, carrier 1002, and payload 1004 independently.

In some embodiments, the movable object 1000 can be configured to communicate with another remote device in addition to the terminal 1012, or instead of the terminal 1012. The terminal 1012 may also be configured to communicate with another remote device as well as the movable object 1000. For example, the movable object 1000 and/or terminal 1012 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1000, receive data from the movable object 1000, transmit data to the terminal 1012, and/or receive data from the terminal 1012. Optionally, the remote device can be connected to the Internet or other telecommunications network, such that data received from the movable object 1000 and/or terminal 1012 can be uploaded to a website or server.

Figure 11:
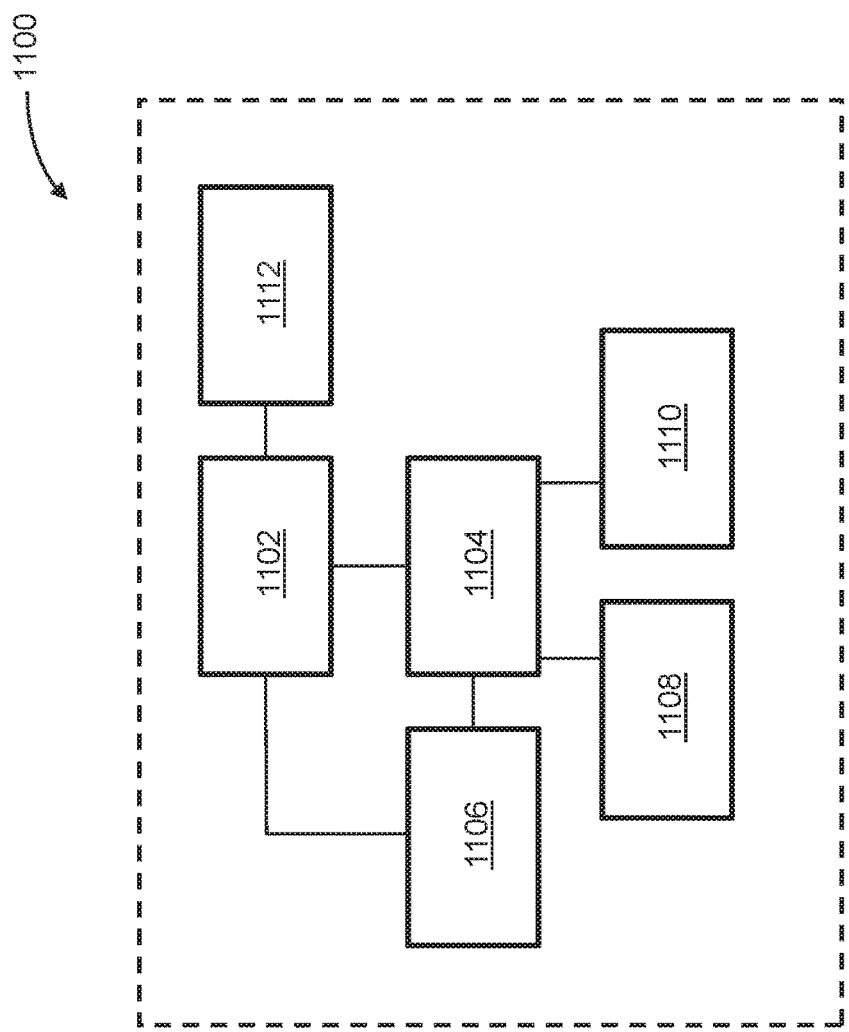
FIG. 11 is a schematic illustration by way of block diagram of a system for controlling a movable object, in accordance with embodiments.

FIG. 11 is a schematic illustration by way of block diagram of a system 1100 for controlling a movable object, in accordance with embodiments. The system 1100 can be used in combination with any suitable embodiment of the systems, devices, and methods disclosed herein. The system 1100 can include a sensing module 1102, processing unit 1104, non-transitory computer readable medium 1106, control module 1108, and communication module 1110.

The sensing module 1102 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1102 can be operatively coupled to a processing unit 1104 having a plurality of processors. In some embodiments, the sensing module can be operatively coupled to a transmission module 1112 (e.g., a Wi-Fi image transmission module) configured to directly transmit sensing data to a suitable external device or system. For example, the transmission module 1112 can be used to transmit images captured by a camera of the sensing module 1102 to a remote terminal.

The processing unit 1104 can have one or more processors, such as a programmable processor (e.g., a central processing unit (CPU)). The processing unit 1104 can be operatively coupled to a non-transitory computer readable medium 1106. The non-transitory computer readable medium 1106 can store logic, code, and/or program instructions executable by the processing unit 1104 for performing one or more steps. The non-transitory computer readable medium can include one or more memory units (e.g., removable media or external storage such as an SD card or random access memory (RAM)). In some embodiments, data from the sensing module 1102 can be directly conveyed to and stored within the memory units of the non-transitory computer readable medium 1106. The memory units of the non-transitory computer readable medium 1106 can store logic, code and/or program instructions executable by the processing unit 1104 to perform any suitable embodiment of the methods described herein. For example, the processing unit 1104 can be configured to execute instructions causing one or more processors of the processing unit 1104 to analyze sensing data produced by the sensing module. The memory units can store sensing data from the sensing module to be processed by the processing unit 1104. In some embodiments, the memory units of the non-transitory computer readable medium 1106 can be used to store the processing results produced by the processing unit 1104.

In some embodiments, the processing unit 1104 can be operatively coupled to a control module 1108 configured to control a state of the movable object. For example, the control module 1108 can be configured to control the propulsion mechanisms of the movable object to adjust the spatial disposition, velocity, and/or acceleration of the movable object with respect to six degrees of freedom. Alternatively or in combination, the control module 1108 can control one or more of a state of a carrier, payload, or sensing module.

The processing unit 1104 can be operatively coupled to a communication module 1110 configured to transmit and/or receive data from one or more external devices (e.g., a terminal, display device, or other remote controller). Any suitable means of communication can be used, such as wired communication or wireless communication. For example, the communication module 1110 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1110 can transmit and/or receive one or more of sensing data from the sensing module 1102, processing results produced by the processing unit 1104, predetermined control data, user commands from a terminal or remote controller, and the like.

The components of the system 1100 can be arranged in any suitable configuration. For example, one or more of the components of the system 1100 can be located on the movable object, carrier, payload, terminal, sensing system, or an additional external device in communication with one or more of the above. Additionally, although FIG. 11 depicts a single processing unit 1104 and a single non-transitory computer readable medium 1106, one of skill in the art would appreciate that this is not intended to be limiting, and that the system 1100 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1100 can occur at one or more of the aforementioned locations.

As used herein A and/or B encompasses one or more of A or B, and combinations thereof such as A and B.

The specific dimensions of any of the apparatuses, devices, systems, and components thereof, of the present disclosure can be readily varied depending upon the intended application, as will be apparent to those of skill in the art in view of the disclosure herein. Moreover, it is understood that the embodiments described herein are for illustrative purposes only and that various modifications or changes in light thereof can be suggested to persons skilled in the art and are included within the spirit and purview of this application and scope of the appended claims. Numerous different combinations of embodiments described herein are possible, and such combinations are considered part of the present disclosure. In addition, all features discussed in connection with any one embodiment herein can be readily adapted for use in other embodiments herein.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for assigning addresses to a plurality of controllers carried by a movable object, the method comprising:
   (a) transmitting an activation signal from a master controller of the movable object to one of the plurality of controllers via a respective first communication interface of a plurality of first communication interfaces connected to the master controller in parallel, thereby activating the one of the plurality of controllers for addressing, wherein the plurality of controllers are each configured to control a component of the movable object, and each of the plurality of communication interfaces corresponds to one of the plurality of controllers;
   (b) transmitting an addressing signal comprising an address from the master controller to the one of the plurality of controllers that is activated for addressing via a second communication interface that is a shared bus interface shared by the plurality of controllers and is different from the first communication interface, thereby causing the address to be assigned to the one of the plurality of controllers;
   (c) receiving a confirmation signal from the one of the plurality of controllers, the confirmation signal being sent in response to the address being successfully assigned to the one of the plurality of controllers; and
   (d) repeating (a)-(c) for each of the plurality of controllers, thereby assigning an address to each of the plurality of controllers.

2. The method of claim 1, wherein the address includes a static address that is invariant during an operation of the movable object and a dynamic address that changes during the operation of the movable object.

3. The method of claim 1, wherein the plurality of controllers comprise a plurality of electronic speed controllers (ESC) each operably coupled to a corresponding propulsion unit of the movable object.

4. The method of claim 1, wherein the plurality of controllers comprise a plurality of sensor controllers each operably coupled to a corresponding sensor of the movable object.

5. The method of claim 1, wherein the respect one of the plurality of first communication interfaces is a unidirectional communication interface allowing one-way communication, in step (a), from the master controller to the one of the plurality of controllers.

6. The method of claim 1, wherein the second communication interface is a bidirectional communication interface allowing two-way communication, in step (b), between the master controller and the one of the plurality of controllers.

7. The method of claim 1, wherein (a)-(d) are performed each time the movable object is powered on.

8. The method of claim 1, further comprising:
   (e) transmitting a query signal to the plurality of controllers via the second communication interface, the query signal comprising the address assigned to the one of the plurality of controllers; and
   (f) receiving a response signal from the one of the plurality of controllers having the address.

9. The method of claim 8, wherein the query signal comprises a request for state information of the one of the plurality of controllers having the address, and the response signal comprises the state information of the one of the plurality of controllers.

10. The method of claim 9, wherein the one of the plurality of controllers is an electronic speed controller (ESC) coupled to an actuator, and wherein the state information comprises a rotation speed of the actuator or a current value for the ESC.

11. A master controller for controlling a plurality of controllers carried by a movable object, the master controller comprising:
   one or more processors; and
   memory comprising instructions executable by the one or more processors to cause the master controller to at least:
      (a) transmit an activation signal to one of the plurality of controllers via a respective first communication interface of a plurality of first communication interfaces connected to the master controller in parallel, thereby activating the one of the plurality of controllers for addressing, wherein the plurality of controllers are each configured to control a component of the movable object, and each of the plurality of communication interfaces corresponds to one of the plurality of controllers;

(b) transmit an addressing signal comprising an address to the one of the plurality of controllers that is activated for addressing via a second communication interface that is a shared bus interface shared by the plurality of controllers and is different from the first communication interface, thereby causing the address to be assigned to the one of the plurality of controllers;

(c) receive a confirmation signal from the one of the plurality of controllers, the confirmation signal being sent in response to the address being successfully assigned to the one of the plurality of controllers; and (d) repeat (a)-(c) for each of the plurality of controllers, thereby assigning an address to each of the plurality of controllers.

12. The master controller of claim 11, wherein the movable object is an unmanned aerial vehicle.

13. The master controller of claim 11, wherein the plurality of controllers comprise a plurality of electronic speed controllers (ESC) each operably coupled to a corresponding propulsion unit of the movable object.

14. The master controller of claim 11, wherein the plurality of controllers comprise a plurality of sensor controllers each operably coupled to a corresponding sensor of the movable object.

15. The master controller of claim 11, wherein the respect one of the plurality of first communication interfaces operably couples, in step (a), the master controller to only the one of the plurality of controllers.

16. The master controller of claim 11, wherein the first communication interface is a unidirectional communication interface allowing one-way communication, in step (a), from the master controller to the one of the plurality of controllers.

17. The master controller of claim 16, wherein said one-way communication comprises at least one of: pulse position modulation signals, pulse width modulation signals, or analog voltage signals.

18. The master controller of claim 11, wherein the second communication interface is a bidirectional communication interface allowing two-way communication, in step (b), between the master controller and the one of the plurality of controllers.

19. The master controller of claim 18, wherein the second communication interface is a bus interface.

20. A method for assigning addresses to a plurality of controllers carried by a movable object, the method comprising:

(a) transmitting an activation signal from a master controller of the movable object to one of the plurality of controllers via a respective first communication interface of a plurality of first communication interfaces connected to the master controller in parallel, thereby activating the one of the plurality of controllers for addressing, wherein the plurality of controllers are each configured to control a component of the movable object, and each of the plurality of communication interfaces corresponds to one of the plurality of controllers;

(b) determining an address for the one of the plurality of controllers based on a physical location of the one of the plurality of controllers with respect to the movable object;

(c) transmitting an addressing signal comprising the address from the master controller to the one of the plurality of controllers that is activated for addressing via a second communication interface that is a shared bus interface shared by the plurality of controllers and is different from the first communication interface, thereby causing the address to be assigned to the one of the plurality of controllers; and (d) repeating (a)-(c) for each of the plurality of controllers, thereby assigning an address to each of the plurality of controllers.

* * * * *